United States Patent
Kim et al.

(10) Patent No.: US 12,544,912 B2
(45) Date of Patent: Feb. 10, 2026

(54) SNAP-THROUGH JOINT MODULE AND SOFT ROBOT INCLUDING SAME

(71) Applicant: Seoul National University R&DB Foundation, Seoul (KR)

(72) Inventors: Ho-Young Kim, Seoul (KR); Ji-Sung Park, Seoul (KR)

(73) Assignee: Seoul National Unviversity R&DB Foundation, Seoul (KR)

( * ) Notice: Subject to any disclaimer, the term of this patent is extended or adjusted under 35 U.S.C. 154(b) by 143 days.

(21) Appl. No.: 18/540,757

(22) Filed: Dec. 14, 2023

(65) Prior Publication Data

US 2024/0238966 A1 Jul. 18, 2024

(30) Foreign Application Priority Data

Jan. 13, 2023 (KR) .......................... 10-2023-0005455

(51) Int. Cl.
*B25J 9/14* (2006.01)
*F15B 15/10* (2006.01)

(52) U.S. Cl.
CPC .............. *B25J 9/142* (2013.01); *B25J 9/146* (2013.01); *F15B 15/10* (2013.01); *F15B 15/103* (2013.01)

(58) Field of Classification Search
CPC . B25J 9/142; B25J 9/146; F15B 15/10; F15B 15/103
See application file for complete search history.

(56) References Cited

U.S. PATENT DOCUMENTS

| | | | |
|---|---|---|---|
| 6,178,872 B1 * | 1/2001 | Schulz | B25J 9/142 92/92 |
| 10,254,499 B1 | 4/2019 | Cohen et al. | |
| 2015/0266186 A1 * | 9/2015 | Mosadegh | F15B 15/08 92/261 |
| 2016/0003268 A1 * | 1/2016 | Shevchenko | F15B 15/103 92/96 |
| 2018/0303698 A1 * | 10/2018 | Wijesundara | F15B 15/10 |
| 2023/0088911 A1 * | 3/2023 | Song | F15B 15/08 92/34 |

FOREIGN PATENT DOCUMENTS

DE 102014106929 A1 * 11/2015 .................. F16J 3/06

OTHER PUBLICATIONS

DE-102014106929-A1 machine translation thereof (Year: 2015).*

* cited by examiner

*Primary Examiner* — Matthew Wiblin
(74) *Attorney, Agent, or Firm* — JCIPRNET

(57) ABSTRACT

A snap-through joint module is provided. The snap-through joint module includes a first member having a first internal space to which pneumatic pressure is applied, a second member having a second internal space to which pneumatic pressure is applied, a snap joint portion configured to connect the first member to the second member and capable of a snap-through movement by pneumatic pressure applied to the first member and the second member, and a controller configured to control pneumatic pressure applied to the first internal space and the second internal space.

15 Claims, 14 Drawing Sheets

SNAP-THROUGH JOINT MODULE AND SOFT ROBOT INCLUDING SAME

CROSS-REFERENCE TO RELATED APPLICATION

This application claims the benefit of Korean Patent Application No. 10-2023-0005455 filed on Jan. 13, 2023, in the Korean Intellectual Property Office, the entire disclosure of which is incorporated herein by reference for all purposes.

BACKGROUND

1. Field of the Invention

One or more embodiments relate to a snap-through joint module and a soft robot including the same.

2. Description of the Related Art

A shell structure made of a soft material has bistability or monostability, where snap-through buckling deformation occurs due to external force and the shell structure deforms into an opposite shape in which the inside and outside turn inside out. The snap-through movement may also operate through pneumatic pressure and have a pattern of cyclical deformation according to pressure. That is, the shape may transition into an inverted shape when pressure exceeds a determined threshold, and conversely, may return to the original shape when the pressure decreases below a determined negative pressure threshold through inhalation.

Pneumatic network (pneu-net), which also uses pneumatic pressure, is a soft actuator device that aims for transformation into a determined shape through designing an internal pneumatic path in an exoskeleton made of a soft material. Movements of extension, contraction, twisting, and bending may be performed by adjusting the geometric shape and material stiffness of each part of the exoskeleton, and recently, research on a jumping movement using buckling instability is also being actively conducted. However, these existing pneu-net researches have a limitation in that each of the movements requires separate input control and pressure needs to be continuously supplied to maintain a deformed shape. The technical limitation may increase the complexity of the soft actuator device and thus increase the volume and weight of the device, which may limit a practical industrial use of the device. Therefore, the importance of developing a mechanism that is capable of transforming into various shapes with a single input control and maintaining the shapes is increasing.

The above description is information the inventor(s) acquired during the course of conceiving the present disclosure, or already possessed at the time, and is not necessarily art publicly known before the present application was filed.

SUMMARY

Embodiments provide a snap-through joint and a soft robot including the same.

According to an aspect, there is provided a snap-through joint module including a first member having a first internal space to which pneumatic pressure is applied, a second member having a second internal space to which pneumatic pressure is applied, a snap joint portion configured to connect the first member to the second member and capable of a snap-through movement by pneumatic pressure applied to the first member and the second member, and a controller configured to control pneumatic pressure applied to the first internal space and the second internal space.

The snap joint portion may include a first snap shell having a shell structure disposed at an end portion of the first member facing the first internal space, a second snap shell having a shell structure disposed at an end portion of the second member facing the second internal space, and an elastic tendon configured to connect the first snap shell to the second snap shell.

The snap-through joint module may further include a flexible, thin film-shaped guide hinge configured to support and connect the end portion of the first member and the end portion of the second member connected by the snap joint portion to allow the first member and the second member to rotate relative to each other.

Each of the first snap shell and the second snap shell may include an elastic cover disposed to face the first internal space and the second internal space, respectively, to which pneumatic pressure is applied and an elastic bladder in a shape of a pocket that is formed integrally with the elastic cover and capable of expansion and contraction.

The elastic tendon may have a tubular structure configured to connect the elastic bladder of the first snap shell to the elastic bladder of the second snap shell to allow communication between the elastic bladder of the first snap shell and the elastic bladder of the second snap shell.

Each of the first snap shell and the second snap shell may be configured to make a snap-back movement so that the elastic bladder contracts inward when pressure formed in the first internal space and the second internal space that the first snap shell and the second snap shell respectively face is less than or equal to a first threshold pressure and make a snap movement as the elastic bladder expands outward when pressure formed in the first internal space and the second internal space that the first snap shell and the second snap shell respectively face is greater than or equal to a second threshold pressure.

When each of the first snap shell and the second snap shell expands and makes a snap movement, each of the first snap shell and the second snap shell may be configured to expand to interfere with each other and the first member and the second member are configured to perform a rotational motion around the guide hinge at a set angle or more, and when each of the first snap shell and the second snap shell contracts and makes a snap-back movement, due to tension formed as the elastic tendon connecting each elastic bladder is stretched, the first member and the second member may be configured to perform an extension motion to have an initial angle before rotation around the guide hinge.

The elastic bladder may have a spherical or arch shape in a portion protruding from the elastic cover.

According to an aspect, there is provided a soft robot including a plurality of drive modules capable of expanding or contracting based on a forward direction through pneumatic pressure and spaced apart from and connected to each other in a direction perpendicular to the forward direction, a plurality of snap joint portions configured to connect a pair of adjacent drive modules among the plurality of drive modules and capable of a snap-through movement by pneumatic pressure applied to the plurality of drive modules, and a controller configured to control pneumatic pressure applied to the plurality of drive modules.

Each of the plurality of snap joint portions may include a first snap shell having a shell structure disposed at an end portion of one drive module of the connected pair of adjacent drive modules facing an internal space of the one drive module, a second snap shell having a shell structure disposed at an end portion of the other drive module of the connected pair of adjacent drive modules facing an internal space of the other drive module, and an elastic tendon configured to connect the first snap shell to the second snap shell.

Each of the first snap shell and the second snap shell is configured to make a snap-back movement to contract inward when pressure formed in an internal space of a drive module in which each of the first snap shell and the second snap shell is less than or equal to a first threshold pressure, and expand outward and make a snap movement when pressure formed in the internal space of the drive module in which each of the first snap shell and the second snap shell is disposed is greater than or equal to a second threshold pressure.

The drive module may include a rear block disposed in a rear based on the forward direction and having an internal space to which pneumatic pressure is applied, a front block disposed in a front based on the forward direction and having an internal space to which pneumatic pressure is applied, a corrugated pipe configured to connect the internal spaces of each of the rear block and the front block along the forward direction to allow communication between the internal spaces and capable of expanding or contracting along the forward direction, and a leg portion disposed on each of the rear block and the front block and having an inclined protrusion protruding backward based on the forward direction at an inclined angle.

The controller may be configured to expand or contract the corrugated pipe of the drive module by repeatedly increasing or decreasing a size of pneumatic pressure applied to the internal space of the drive module in a range between the first threshold pressure and the second threshold pressure.

The drive module may include an upper housing having an internal space extending along the forward direction, a lower base disposed below the upper housing and configured to form a floor of the internal space, and a leg portion formed at and protruding from each of points of the lower base that are spaced apart from each other along the forward direction.

The drive module may be a pneumatic network (pneu-net) member in which a degree of deformation due to pneumatic pressure is greater in an upper portion of the drive module.

The lower base may be made of a stronger material than the material of the upper housing.

The elastic tendon may have a tubular structure configured to connect the first snap shell to the second snap shell to allow communication between the first snap shell and the second snap shell.

The soft robot may further include a plurality of guide hinges disposed between each of the end portions of the pair of drive modules connected by the plurality of snap joint portions and configured to support and connect the pair of drive modules to allow each of the pair of drive modules to rotate around a rotation axis parallel to the forward direction, wherein, when the controller allows each of the first snap shell and the second snap shell of each of the plurality of snap joint portions to make a snap movement to push each other by expanding each of the first snap shell and the second snap shell, the plurality of drive modules connected by the plurality of snap joint portions may be configured to rotate around the plurality of guide hinges at a set angle or more so that the plurality of drive modules are arranged in a ring shape that is radially spaced apart from each other.

Each of the plurality of drive modules may include a guide magnet disposed at the end portions to which the guide hinge is connected, wherein, when the plurality of drive modules rotates radially to have a ring shape, the guide magnet of each of the pair of adjacent drive modules may be configured to magnetically contact each other and maintain a posture between the pair of adjacent drive modules.

Additional aspects of embodiments will be set forth in part in the description which follows and, in part, will be apparent from the description, or may be learned by practice of the disclosure.

According to embodiments, elemental technology may be employed in the snap-through joint module that may solve the limitations of existing pneumatically controlled soft actuators that each of target movements and functions requires separate input control and that pressure needs to be continuously supplied to maintain a deformed shape. The technology may not only realize lightweighting of existing pneu-net devices that are bulky and heavy due to a complex flow path and circuit design, but also allow various shapes and functions to be performed with a single control.

According to embodiments, the snap-through joint module and the soft robot may each have a shell structure made of the same silicone material so that the snap-through joint module may be easily transplanted into the pneu-net system, and may thus provide a structure in which the soft robot may transition between two-dimensional and cylindrical three-dimensional shapes by bending and truncation deformations in a joint portion through a snap-through movement by pressure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
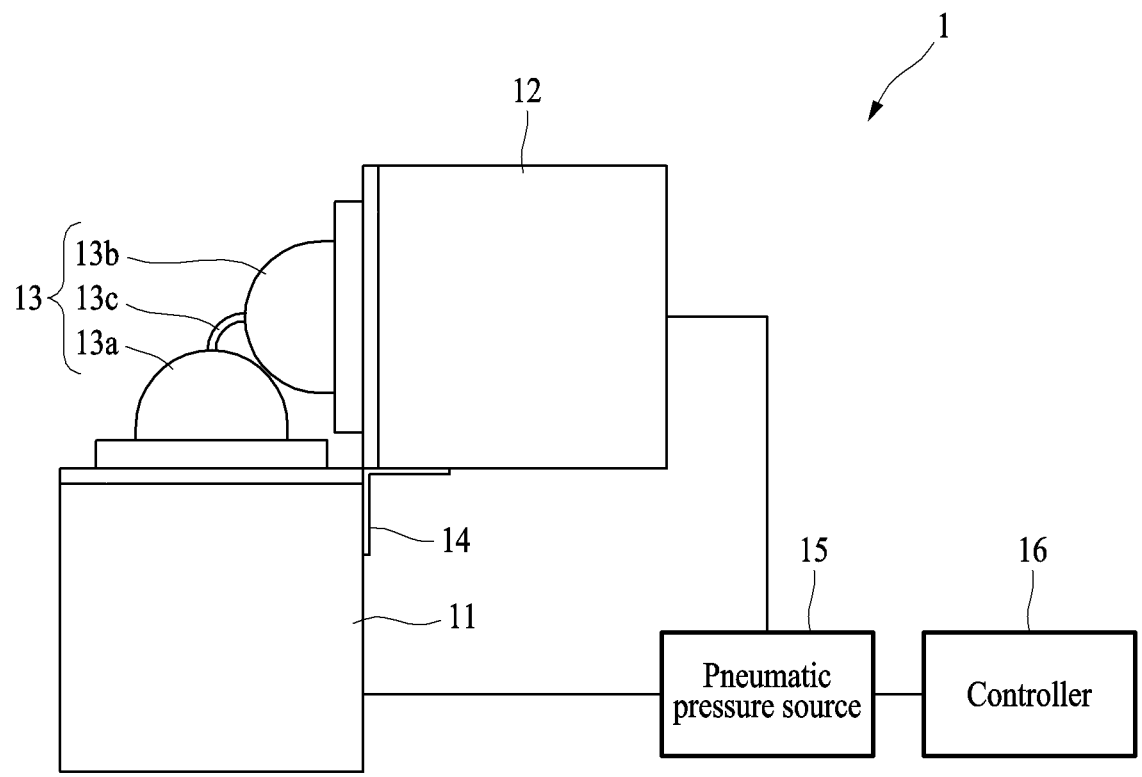
FIG. 1 is a diagram schematically illustrating a configuration of a snap-through joint module according to an embodiment.

Hereinafter, embodiments are described in detail with reference to the accompanying drawings. The following description is one of several aspects of embodiments and the following description forms part of the detailed description of the embodiments.

In describing an embodiment, a detailed description of a well-known function or configuration is omitted to clarify the present disclosure.

In addition, terms or words used in the present specification and claims should not be construed in general meanings or dictionary definitions, and based on a principle that the inventor may properly define the concept of terms to best describe their disclosure, the terms or words should be construed as meanings and concepts consistent with the technical idea of a snap-through joint and a soft robot including the same according to an embodiment.

The embodiments described in this specification and the configuration shown in the drawings are ones of the most desirable embodiments of a snap-through joint and a soft robot including the same according to an embodiment and do not represent all technical ideas of a snap-through joint and a soft robot including the same. Therefore, it should be understood that various equivalents and modifications that can replace the embodiments may be available at the time of application of the present disclosure.

Figure 2:
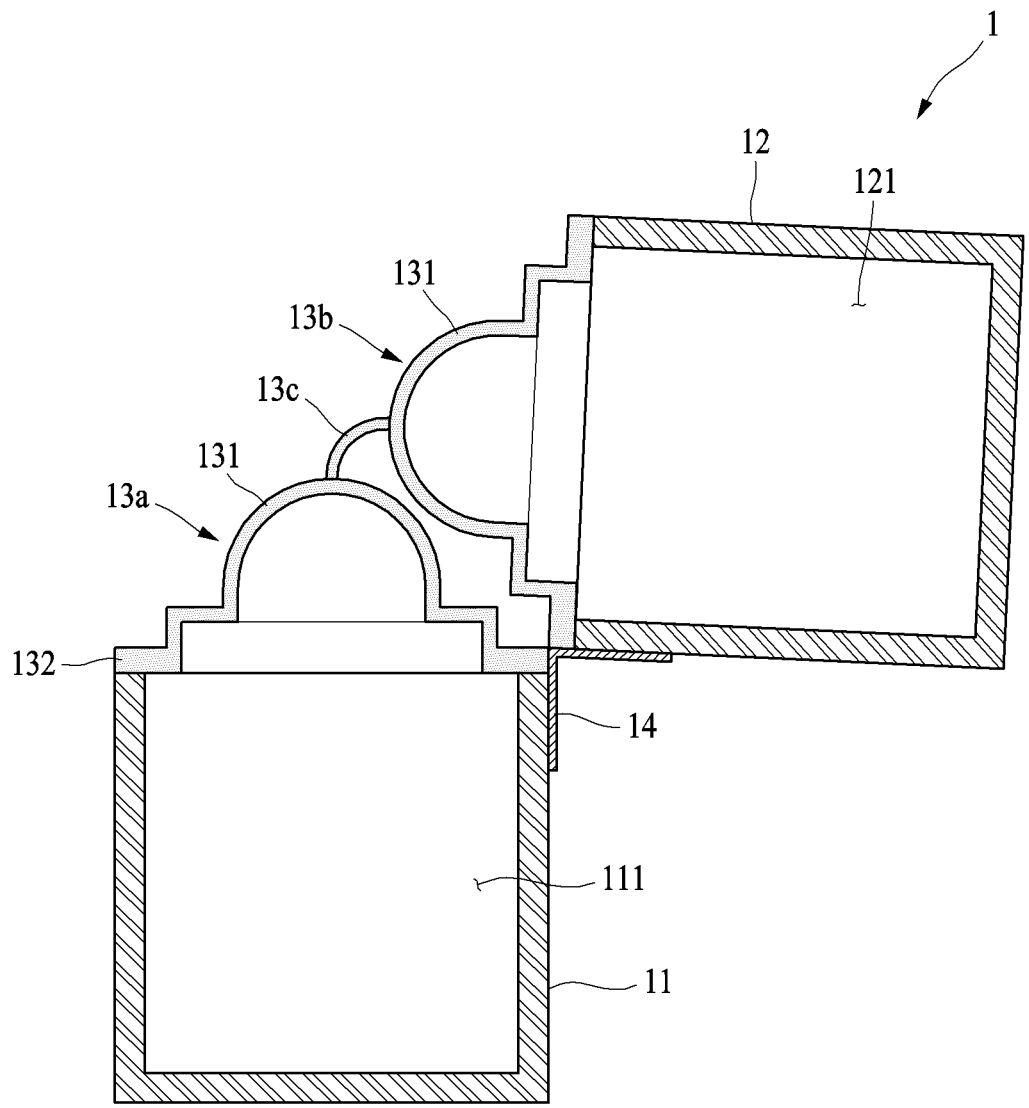
FIG. 2 is a cross-sectional view illustrating a snap joint portion that expands and makes an outward snap movement, according to an embodiment.
Figure 3:
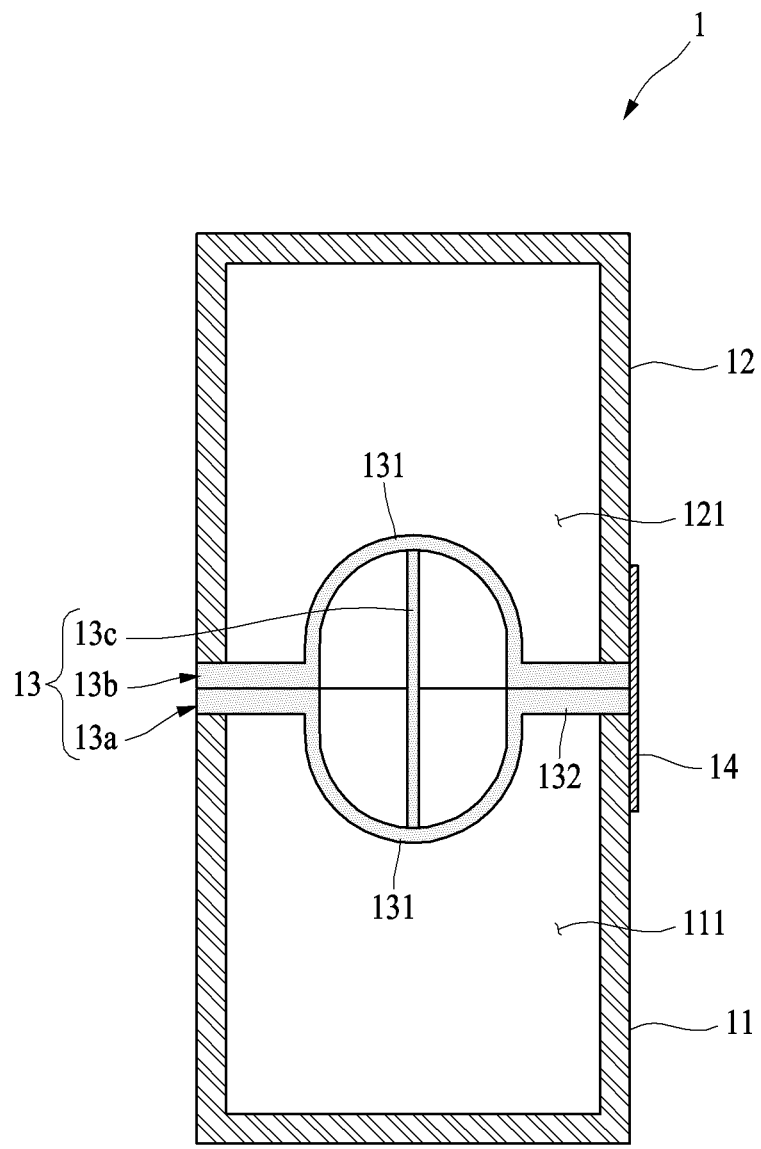
FIG. 3 is a cross-sectional view illustrating the snap joint portion that contracts inward and makes a snap-back movement, according to an embodiment.
Figure 4:
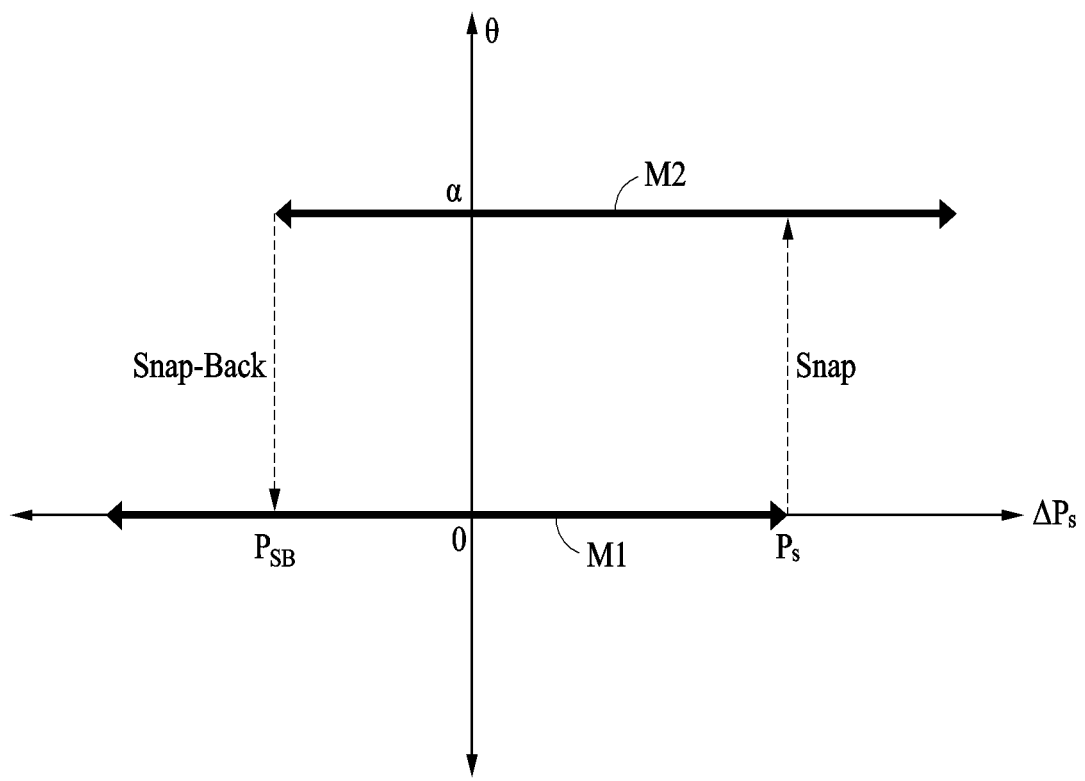
FIG. 4 is a graph illustrating a joint drive angle and threshold pressure according to a snap-through movement based on the magnitude of pressure applied to the snap-through joint module, according to an embodiment.

FIG. 1 is a diagram schematically illustrating a configuration of a snap-through joint module according to an embodiment, FIG. 2 is a cross-sectional view illustrating a snap joint portion that expands and makes an outward snap movement, according to an embodiment, FIG. 3 is a cross-sectional view illustrating the snap joint portion that contracts inward and makes a snap-back movement, according to an embodiment, and FIG. 4 is a graph illustrating a joint drive angle and threshold pressure according to a snap-through movement based on the magnitude of pressure applied to the snap-through joint module, according to an embodiment.

Referring to FIGS. 1 to 4, a snap-through joint module 1 may operate through pneumatic pressure and may be capable of driving a joint through snap-through buckling.

The snap-through joint module 1 may include a first member 11 having a first internal space 111 to which pneumatic pressure is applied, a second member 12 having a second internal space 121 to which pneumatic pressure is applied, a snap joint portion 13 configured to connect the first member 11 to the second member 12, a guide hinge 14 configured to support and connect an end portion of the first member 11 and an end portion of the second member 12 connected by the snap joint portion 13 to allow the first member 11 and the second member 12 to rotate relative to each other, a pneumatic pressure source 15 that supplies pneumatic pressure, and a controller 16 configured to control pneumatic pressure applied to the first internal space 111 of the first member 11 and the second internal space 112 of the second member 12.

The guide hinge 14 may connect the first member 11 to the second member 12 and guide a direction of a folding or bending movement between the first member 11 and the second member 12 at the same time.

For example, the guide hinge 14 may be a flexible thin film-shaped member coupled to the end portions of the first member 11 and the second member 12 to come into surface contact with the end portions of the first member 11 and the second member 12.

The snap joint portion 13 may include a first snap shell 13a having a shell structure disposed on the first member 11, a second snap shell 13b having a shell structure disposed on the second member 12, and an elastic tendon 13c configured to connect the first snap shell 13a to the second snap shell 13b.

For example, the first snap shell 13a may be disposed at an end portion of the first member 11 facing the first internal space 111 and make a snap-through movement based on the magnitude of pressure formed in the first internal space 111.

For example, the second snap shell 13b may be disposed at an end portion of the second member 12 facing the second internal space 121 and make a snap-through movement based on the magnitude of pressure formed in the second internal space 121.

For example, the first snap shell 13a and the second snap shell 13b may each include a flexible and elastic elastomeric material such as polymer or rubber.

For example, each of the first snap shell 13a and the second snap shell 13b may include an elastic cover 132 disposed to face the internal space 111 and the second internal space 121, respectively, to which pneumatic pressure is applied, and an elastic bladder 131 in a shape of a pocket that is formed integrally with the elastic cover 132 and capable of expansion and contraction.

For example, the elastic cover 132 may form a portion of an end surface in which the first member 11 and the second member 12 are connected to each other through the snap joint portion 13, as shown in FIGS. 2 and 3.

For example, the elastic bladder 131 may have an arch or spherical shape in a portion protruding from the elastic cover 132.

For example, based on the magnitude of the pressure formed in the first internal space 111 and the second internal space 121, snap-through buckling, in which the first snap shell 13a and the second snap shell 13b expand outward or contract inward, may occur.

First, when the magnitude of the pressure formed in each of the first internal space 111 and the second internal space 121 is greater than or equal to a second threshold pressure $P_s$, each of the elastic bladders 131 of the first snap shell 13a and the second snap shell 13b may make a "snap movement," in which the elastic bladder 131 expands to be convex outward, as shown in FIGS. 2 and 4.

In this case, each of the elastic bladders 131 of the first snap shell 13a and the second snap shell 13b that expand outward may, as interfering with each other, generate force to push each other. As a result, the first member 11 and the second member 12 may rotate around the guide hinge 14 at or above a set angle a, as shown in FIGS. 2 and 4.

Subsequently, when the magnitude of the pressure formed in each of the first internal space 111 and the second internal space 121 is less than or equal to a first critical pressure $P_{SB}$, each of the elastic bladders 131 of the first snap shell 13a and the second snap shell 13b may make a "snap-back movement," in which the elastic bladder 131 contracts to be concave toward the inside, as shown in FIGS. 3 and 4.

In this case, each of the elastic bladders 131 of the first snap shell 13a and the second snap shell 13b that contract inward may, as the tension formed as the elastic tendon 13c connecting the elastic bladders 131 is stretched may act as a restoring force, make an extension motion so that the first member 11 and the second member 12 that rotated around the guide hinge 14 form an initial angle before rotation, as shown in FIGS. 3 and 4.

For example, the above-described state in which the snap joint portion 13 makes a snap-back movement and the first member 11 and the second member 12 are extended relative to each other may be referred to as a first mode M1 state.

For example, the above-described state in which the snap joint portion 13 makes a snap movement and the first member 11 and the second member 12 rotate relative to each other may be referred to as a second mode M2 state.

For example, when the snap joint portion 13 makes a snap-back movement, the first member 11 and the second member 12 may be aligned with respect to each other as shown in FIG. 3, that is, the angle they make with respect to each other may be of zero degrees. For example, the first threshold pressure $P_{SB}$ may be a negative pressure.

For example, pneumatic pressure may be applied to the first internal space 111 of the first member 11 and the second internal space 121 of the second member 12 through a separate tubular member connected from the pneumatic pressure source 15.

For example, the controller 16 may individually adjust the pneumatic pressure applied from the pneumatic pressure source 15 to each of the first internal space 111 and the second internal space 121.

For example, the first internal space 111 and the second internal space 121 may be connected to communicate with each other through a separate tubular member. For example, the elastic tendon 13c may be a tubular member that connects the first snap shell 13a to the second snap shell 13b to allow communication between the first snap shell 13a and the second snap shell 13b.

In this case, the controller 16 may adjust the pressures of the first internal space 111 and the second internal space 121 to be equal to each other even when pneumatic pressure is applied to only one of the first member 11 and the second member 12.

Referring to FIG. 4, the characteristic in which a bending state of the snap-through joint module 1, that is, a rotation angle theta changes and a mode switching between the two modes M1 and M2 occurs based on the first threshold pressure $P_S$, and the second threshold pressure $P_{SB}$, at which the pressures formed in the first internal space 111 and the second internal space 121 respectively cause snap-through buckling deformation of the snap joint portion 13, may be determined through the graph.

For example, in the first mode M1 state in which the snap joint portion 13 makes a snap-back movement, when the magnitude of the pressure is not greater than the second threshold pressure $P_S$ even when the pressure applied to the first and second internal spaces 111 and 121 is increased, the snap joint portion 13 may not make a snap movement and maintain the first mode M1 state in which the elastic bladder 131 is contracted inward. However, when the magnitude of the pressure is greater than the second threshold pressure $P_S$, the snap joint portion 13 may expand outward and make a snap movement, as shown in FIG. 2.

Similarly, in the second mode M2 state in which the snap joint portion 13 makes a snap movement, when the pressure is not less than the first threshold pressure $P_{SB}$ even when a negative pressure is formed in the first and second internal spaces 111 and 121, the snap joint portion 13 may not make a snap-back movement and maintain the second mode M2 state in which the elastic bladder 131 expanded outward. However, when the internal pressure is less than the first threshold pressure $P_{SB}$ ($P<P_{SB}$), the snap joint portion 13 may contract inward and make a snap-back movement, as shown in FIG. 3.

Figure 5:
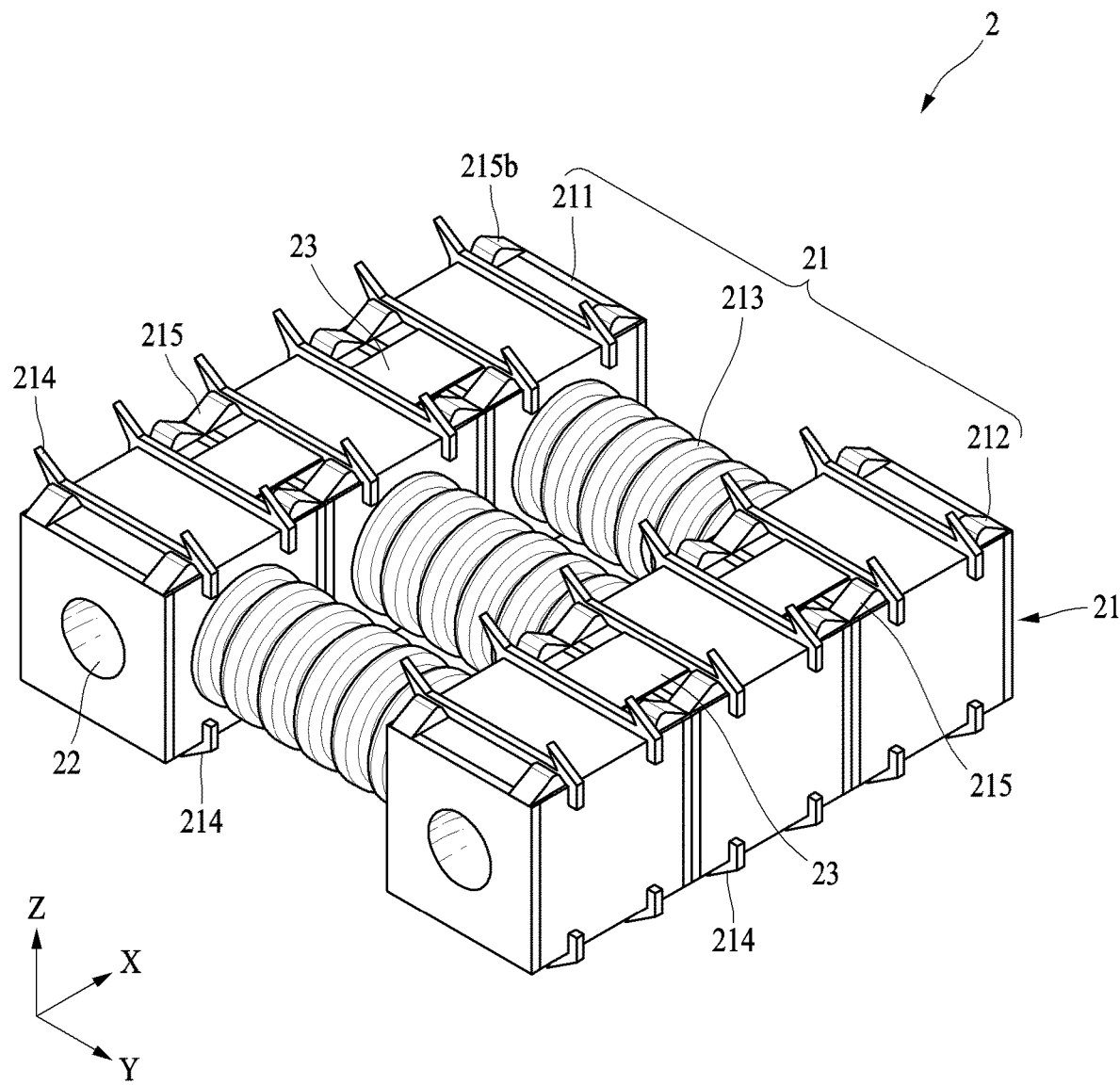
FIG. 5 is a perspective view illustrating a first mode state of a soft robot according to an embodiment.
Figure 6:
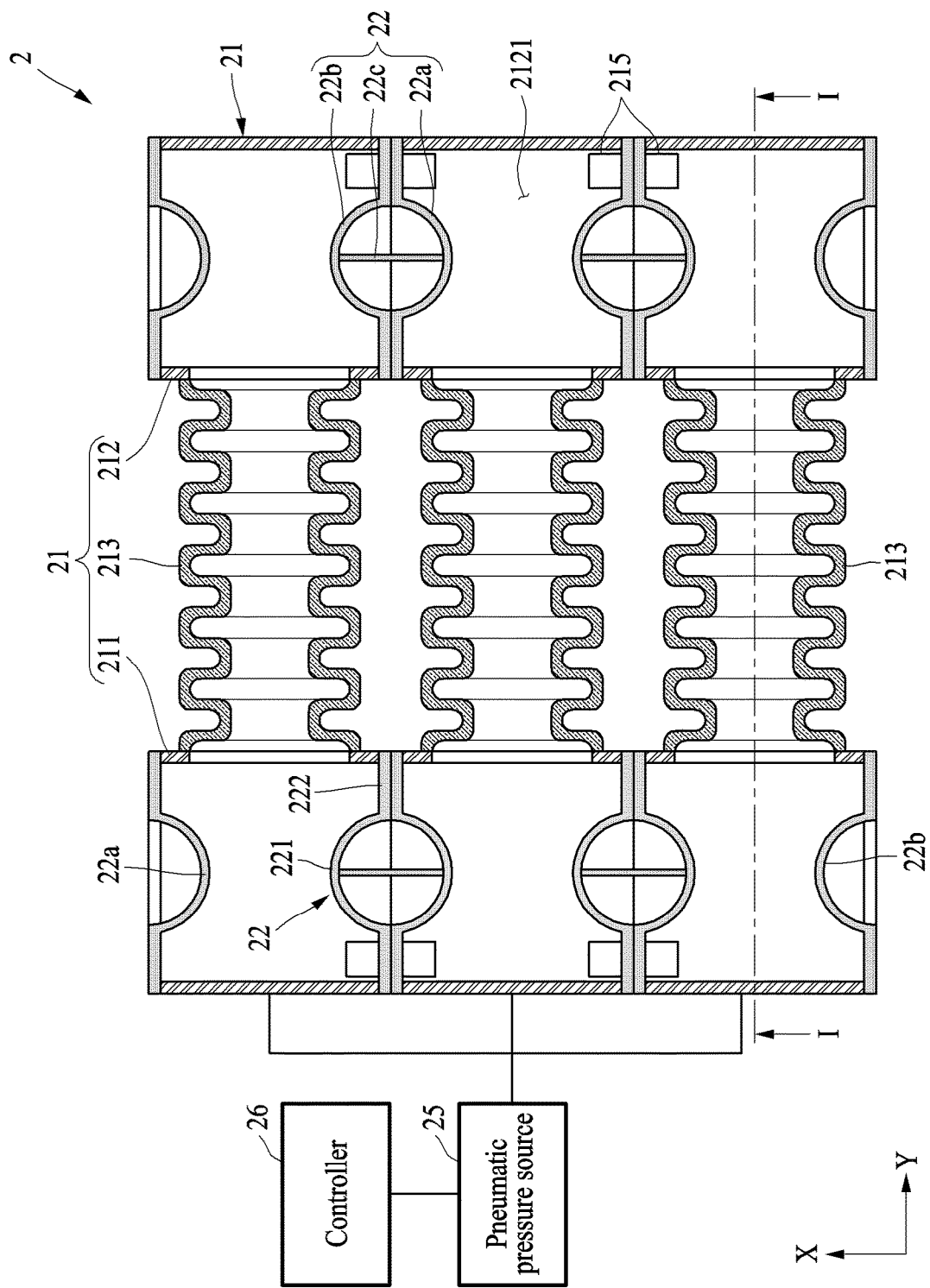
FIG. 6 is a horizontal cross-section schematically illustrating a configuration of the soft robot according to an embodiment.
Figure 7:
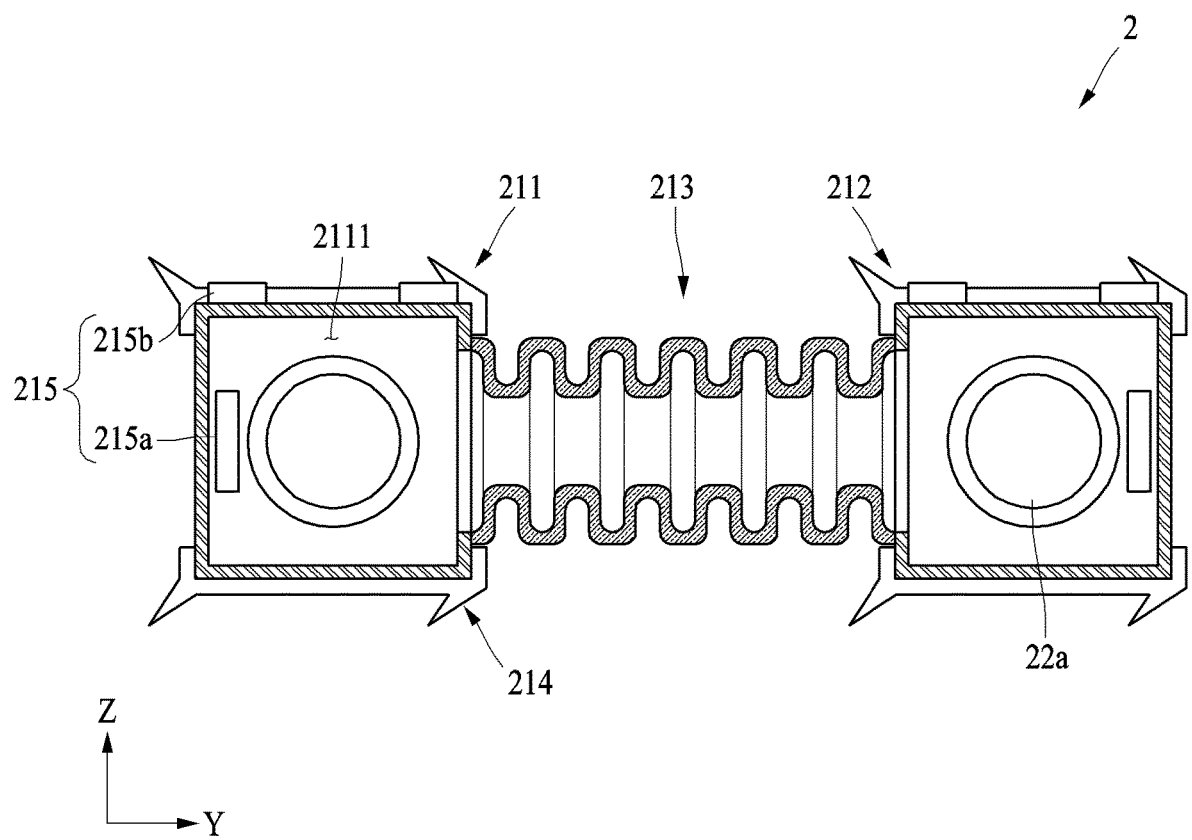
FIG. 7 is a vertical cross-section of the soft robot according to an embodiment.
Figure 8:
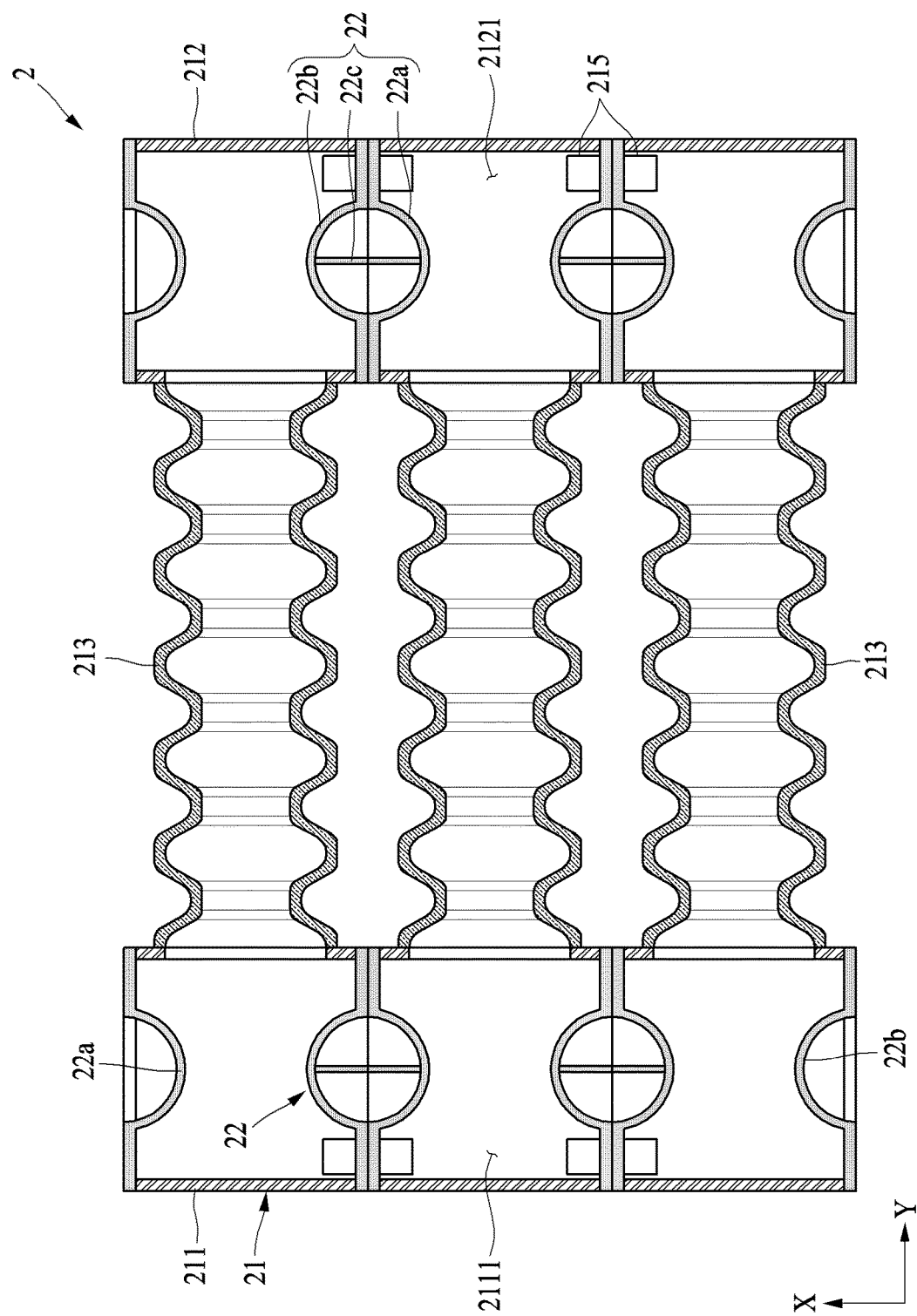
FIG. 8 is a horizontal cross-section of the soft robot according to an embodiment.
Figure 9:
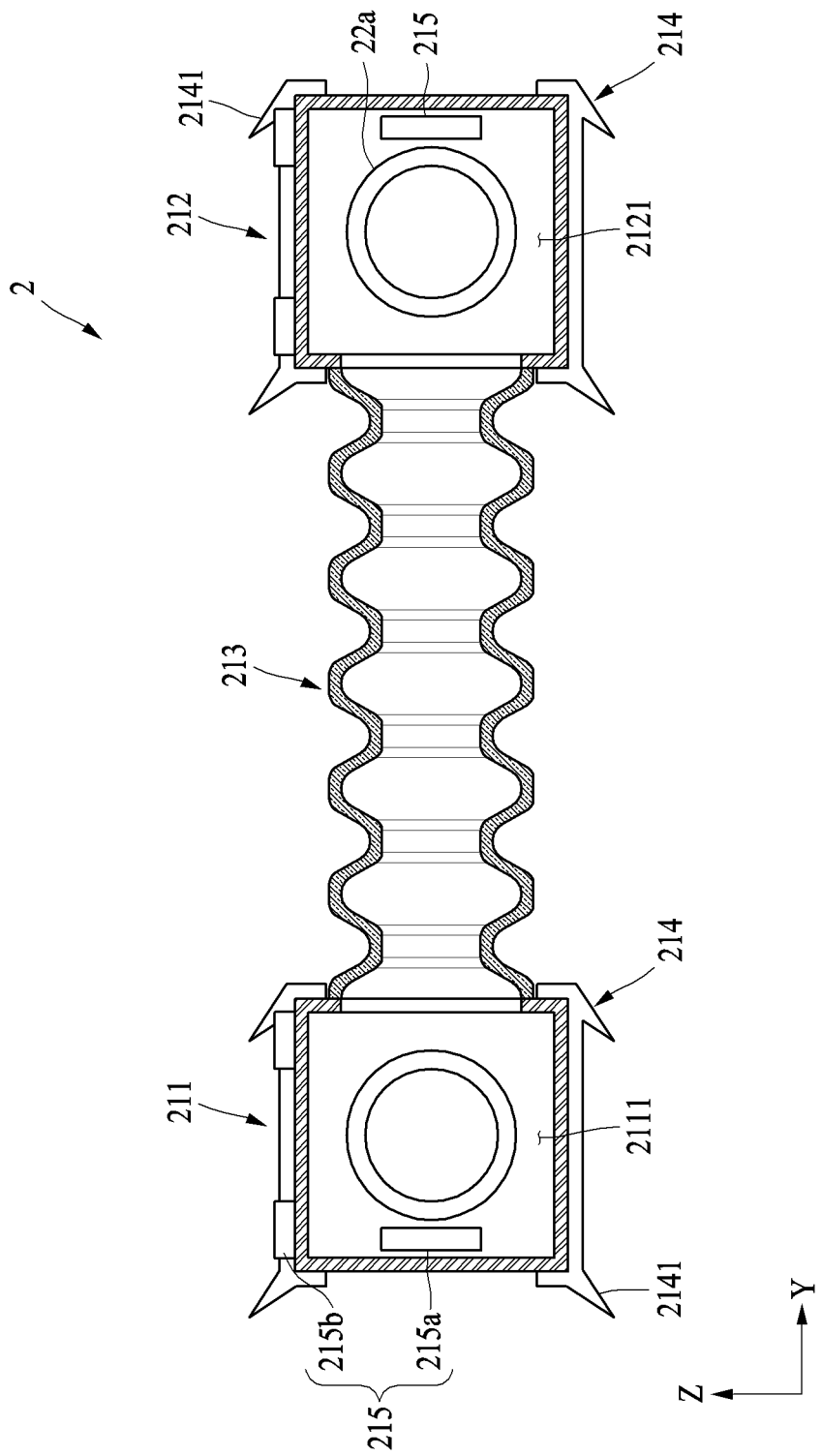
FIG. 9 is a vertical cross-section of the soft robot according to an embodiment.
Figure 10:
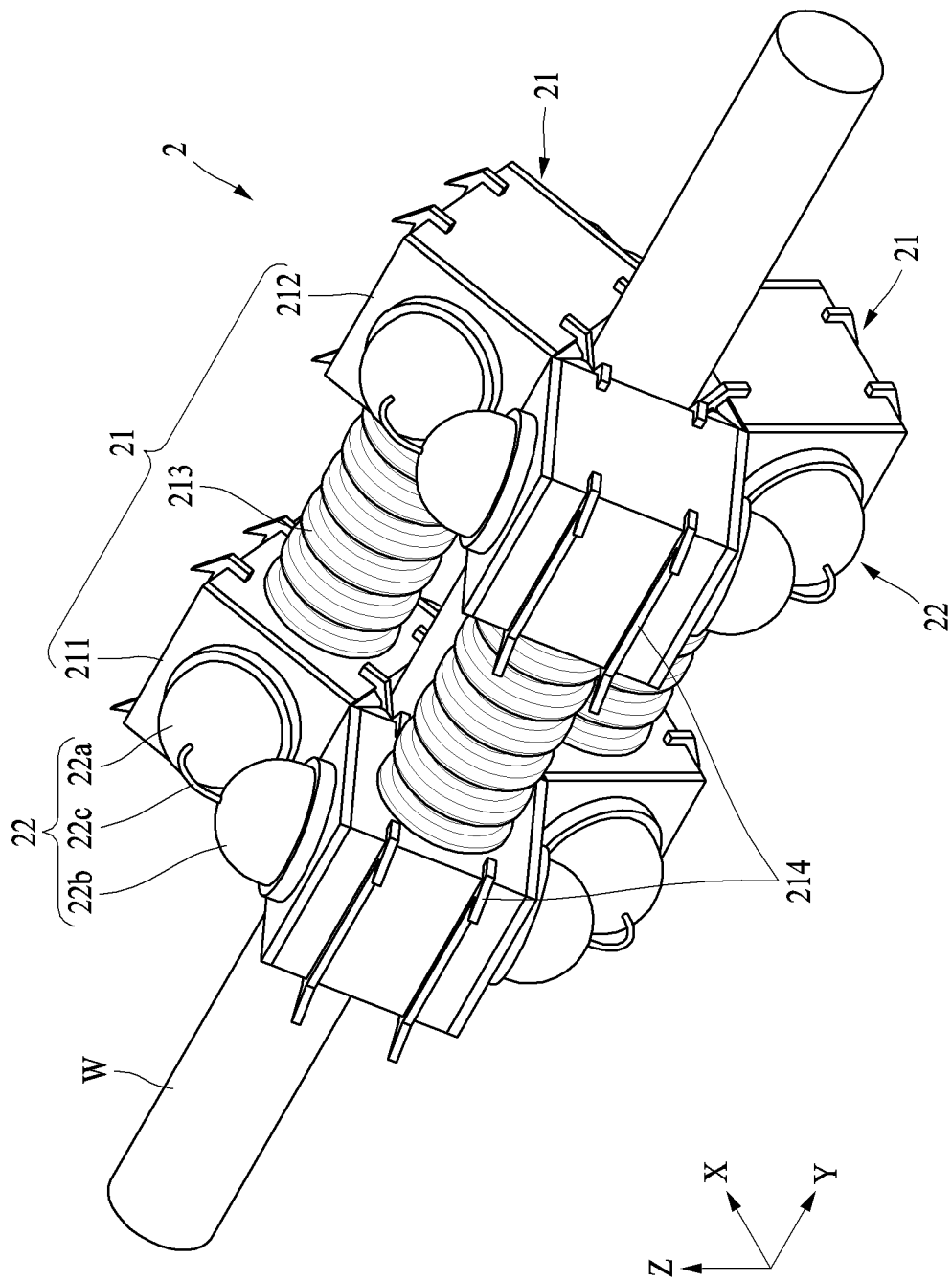
FIG. 10 is a perspective view illustrating a second mode state of the soft robot according to an embodiment.
Figure 11:
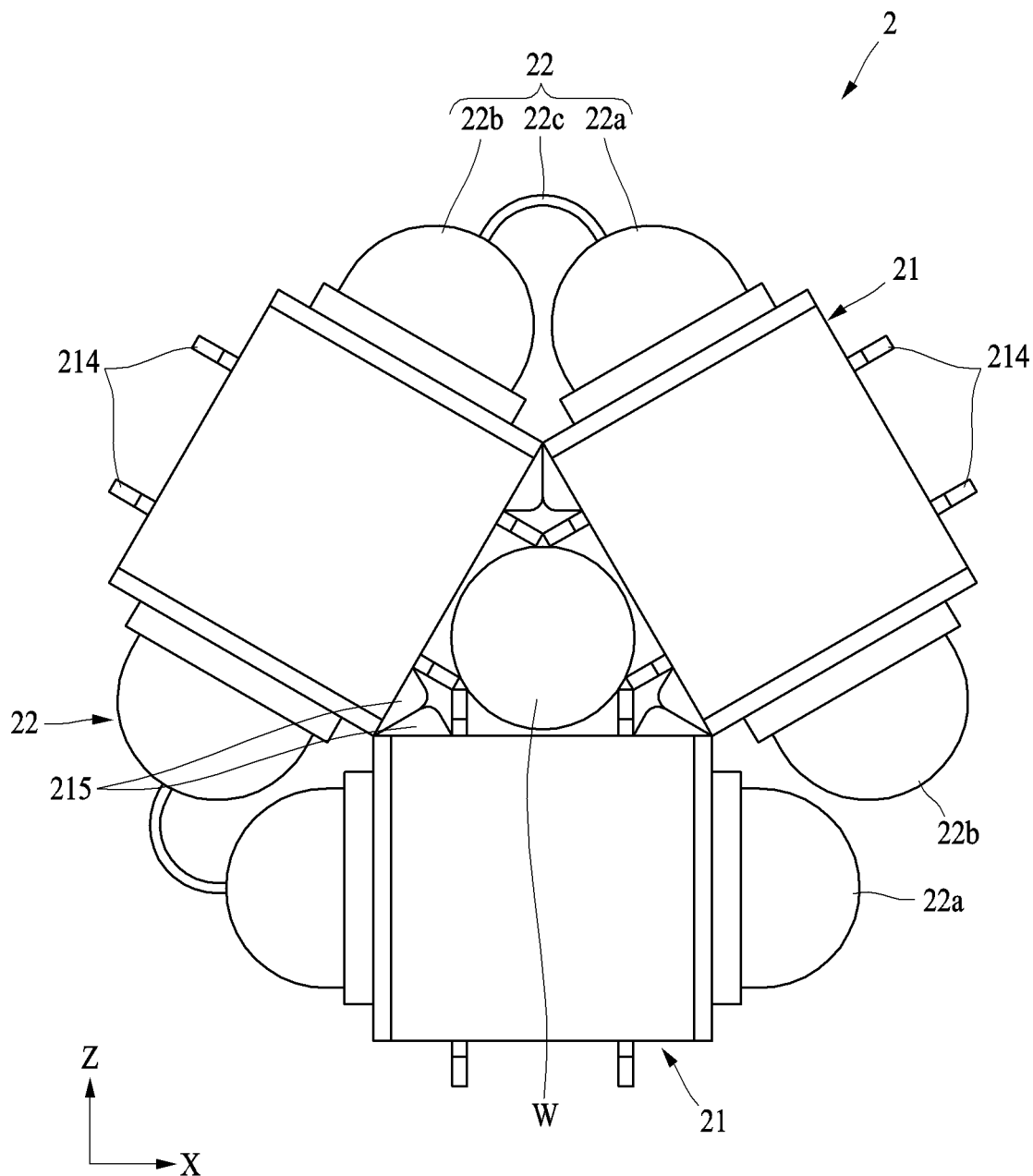
FIG. 11 is a front view of the soft robot according to an embodiment.

FIG. 5 is a perspective view illustrating a first mode state of a soft robot according to an embodiment, FIG. 6 is a horizontal cross-section schematically illustrating a configuration of the soft robot according to an embodiment, FIG. 7 is a vertical cross-section of the soft robot according to an embodiment, FIG. 8 is a horizontal cross-section of the soft robot according to an embodiment, FIG. 9 is a vertical cross-section of the soft robot according to an embodiment, FIG. 10 is a perspective view illustrating a second mode state of the soft robot according to an embodiment, and FIG. 11 is a front view of the soft robot according to an embodiment.

Referring to FIGS. 5 to 11, a soft robot 2 may be a soft actuator robot that may selectively and reversibly switch between the two types of modes by employing the configuration of the snap-through joint module 1 of the embodiments illustrated with reference to FIGS. 1 to 4.

First, referring to FIGS. 5 to 9, a configuration of operation of the soft robot 2 in the first mode state in which an arrangement forms along a plane may be known.

The soft robot 2 may include a plurality of drive modules 21 capable of expanding or contracting based on a forward direction (a Y-axis direction in the drawing) through pneumatic pressure and spaced apart from each other in a direction perpendicular to the forward direction, a plurality of snap joint portions 22 configured to connect a pair of adjacent drive modules 21 among the plurality of drive modules 21, a guide hinge 23 configured to support and connect end portions of a pair of adjacent drive modules 21 among the plurality of drive modules 21 so that each of the pair of adjacent drive modules may rotate relative to each other, a pneumatic pressure source 25 that supplies pneumatic pressure, and a controller 26 configured to control pneumatic pressure applied to internal spaces of the plurality of drive modules 21.

For example, the drive module 21 may be a pneumatic network (pneu-net) member that may transform into a determined shape through designing an internal space in which pneumatic pressure is applied to an exoskeleton made of a soft material.

For example, each of the plurality of drive modules 21 may have a structure that performs expansion and contraction motions through control of pneumatic pressure as shown in FIGS. 5 to 11. In another example, however, the plurality of drive modules 21 may also include various soft actuator structures that are made of elastomeric material, that have a channel or chamber into which pneumatic pressure is applied, and that are capable of movements of extension, contraction, twisting, bending, jumping, and the like.

For example, when the snap joint portion 22 connected between the adjacent drive modules 21 makes a snap-back movement in which the snap joint portion 22 contracts inward, the plurality of drive modules 21 may take a form of the first mode, in which the plurality of drive modules 21 are arranged side by side along a direction of a plane (an X-axis direction in the drawing) perpendicular to a forward direction (a Y-axis direction in the drawing), as shown in FIGS. 5 to 9.

In addition, FIG. 7 illustrates a vertical cross-sectional structure of the drive module 21 taken along the line I-I of FIG. 6.

For example, when the snap joint portion 22 connected between the adjacent drive modules 21 expands outward and makes a snap movement, the plurality of drive modules 21 may take a form of a second mode, in which the plurality of drive modules 21 rotates around the plurality of guide hinges 23 at a set angle or more so that the plurality of drive modules 21 may be arranged in a ring shape, as shown in FIGS. 10 and 11.

For example, the plurality of drive modules 21 may include three components as shown in FIGS. 5 to 11. In another example, however, the plurality of drive modules 21 may include four or more components.

For example, each of the plurality of drive modules 21 may include a rear block 211 disposed in the rear based on the forward direction (the Y-axis direction in the drawing) and having an internal space 2111 to which pneumatic pressure is applied, a forward block 212 disposed in the front based on the forward direction and having an internal space 2121 to which pneumatic pressure is applied, a corrugated pipe 213 configured to connect the internal spaces of each of the rear block 211 and the front block 212 along the forward direction to allow communication between the internal spaces and capable of expanding or contracting along the forward direction, a leg portion 214 disposed on each of the rear block 211 and the front block 212 and having an inclined protrusion 2141 protruding backward based on the forward direction at an inclined angle, and a guide magnet 215 disposed at the end portions to which the guide hinge 23 is connected.

The rear block 211 may be a box-shaped member having the internal space 2111. For example, as shown in FIGS. 5 to 9, the snap joint portion 22 may be disposed between the end portion surfaces of the rear blocks 211 of the adjacent drive modules 21 facing each other among the rear blocks 211.

The front block 212 may be a box-shaped member having the internal space 2121. For example, as shown in FIGS. 5 to 9, the snap joint portion 22 may be disposed between the end portion surfaces of the front blocks 212 of the adjacent drive modules 21 facing each other among the front blocks 212.

The corrugated pipe 213 may be an extensible tubular member connecting the rear block 211 to the front block 212 along the forward direction.

For example, the internal spaces 2111 and 2121 of the front block 212 and the rear block 211 may communicate with each other through the corrugated pipe 213.

According to the above structure, a total of two snap joint portions 22 may be disposed at each connection point of the front block 212 and the rear block 211 between the adjacent drive modules 21, and the internal spaces 2111 and 2121 of each of the front block 212 and the rear block 211 may communicate through the corrugated pipe 213 so that the magnitude of the internal pressure may be adjusted to the same state and thus a snap movement or snap-back movement of the two snap joint portions 22 may occur at the same time. Accordingly, a posture and shape of connection of each of the drive modules 21 to the rear block 211, the corrugated pipe 213, and the front block 212 may be maintained regardless of the movement of the snap joint portion 22.

The leg portion 214 may be disposed on a portion of each of the rear block 211 and the front block 212 that faces each other in the direction perpendicular to the forward direction to provide a movement direction to the soft robot 2.

For example, the leg portion 214 may be disposed on a bottom portion of each of the rear block 211 and the front block 212, as shown in FIG. 7.

For example, the leg portion 214 may include the inclined protrusion 2141 protruding backward based on the forward direction at an inclined angle. For example, the inclined protrusion 2141 may have a leg structure that protrudes backward in a ratchet shape, as shown in FIG. 7.

According to the structure of the leg portion 214, as shown in FIGS. 6 to 9, while each of the drive modules 21 repeatedly performs an extension or contraction motion through the corrugated pipe 213 through pneumatic pressure applied to the plurality of drive modules 21, each of the rear block 211 and the front block 212 may alternately act as a stepping axis for a walking motion in the forward direction of each other in a state in which a rearward movement is restricted by the inclined protrusion 2141 that is biased and protruding backward.

For example, as shown in FIGS. 5 to 11, the leg portion 214 may be disposed on both the lower and upper portions perpendicular to the forward direction among portions of each of the rear block 211 and the front block 212.

According to the above structure, as shown in FIGS. 10 and 11, in the form of the second mode in which the soft robot 2 is arranged in a ring shape, when the soft robot 2 moves while holding a wire W wrapping inside, the leg portion 214 disposed on the upper side of each of the rear block 211 and front block 212 may hold the wire W and perform a climbing motion.

When the soft robot 2 takes the form of either the first mode or the second mode, the guide magnet 215 may guide the soft robot 2 to maintain the posture of each mode.

For example, the guide magnet 215 may include a first magnet 215a disposed in the internal spaces 2111 and 2121 of each of the rear block 211 and the front block 212 to maintain the form of the first mode of the soft robot 2 and a second magnet 215b disposed on the end portion of each of the rear block 211 and the front block 212 connected from the outside through the guide hinge 23 to maintain the form of the second mode of the snap joint portion 22.

For example, as shown in FIGS. 6 and 8, the first magnet 215a may be disposed on an inner wall portion of each of the rear block 211 and the front block 212 connected to be adjacent to each other in a horizontal direction in the form of the first mode form in which the soft robot 2 is arranged in a plane.

For example, as shown in FIGS. 5 and 11, the second magnet 215b may be disposed on portions of the rear block 211 and the front block 212 in which each of the blocks rotate around the guide hinge 23 and bend or fold to be closer to the adjacent rear and front blocks 211 and 212 in the form of the second mode in which the plurality of drive modules 21 is arranged in a ring shape.

For example, as shown in FIGS. 5 and 11, the second magnet 215b may have a contact surface of an inclined shape so that the plurality of drive modules 21 may have surface contact with each other corresponding to the angle at which the plurality of drive modules 21 rotate around the guide hinge 23.

For example, the snap joint portion 22 may include a first snap shell 22a having a shell structure disposed on one drive module 21 of the connected pair of adjacent drive modules 21, a second snap shell 22b having a shell structure disposed on the other drive module 21, and an elastic tendon 22c configured to connect the first snap shell 22a to the second snap shell 22b.

For example, between the connected pair of drive modules 21, two snap joint portions 22 may be disposed at each connection point of the front block 212 and the rear block 211.

That is, the first snap shell 22a may be disposed at the end portion of one drive module 21 among the connected pair of adjacent drive modules 21 facing the internal spaces 2111 and 2121 of each of the front block 212 and the rear block 211 of the one drive module 21, and the second snap shell 22b may be disposed at the end portion of the other drive module 21 among the connected pair of adjacent drive modules 21 facing the internal spaces 2111 and 2121 of each of the front block 212 and the rear block 211 of the other drive module 21.

For example, the first snap shell 22a and the second snap shell 22b may include a flexible and elastic elastomeric material such as polymer or rubber.

For example, each of the first snap shell 22a and the second snap shell 22b may include an elastic cover 222 disposed to face the internal spaces 2111 and 2121, respectively, to which pneumatic pressure is applied, and an elastic bladder 221 in a shape of a pocket that is formed integrally with the elastic cover 222 and capable of expansion and contraction.

For example, as shown in FIGS. 5 to 9, the snap joint portion 22 may be disposed between the pair of drive modules 21 arranged adjacent to each other in the horizontal direction (the X-axis direction in the drawing) perpendicular to the forward direction. In addition, the first snap shell 22a and the second snap shell 22b of the snap joint portion 22 may also be disposed on outer portions of each of the drive modules 21 located on the outermost sides on both sides along the horizontal direction.

For example, as shown in FIGS. 5 to 8, when the pressure applied to the internal spaces 2111 and 2121 of each of the connected drive modules 21 adjacent to each other is less than the first threshold pressure $P_{SB}$, each of the elastic bladders 221 of the first snap shell 22a and the second snap shell 22b may make a snap-back movement toward the inside and the elastic tendon 22c connecting the elastic bladders 221 of the first snap shell 22a and the second snap shell 22b may be stretched, thereby forming tension. The tension may act as a restoring force so that the adjacent drive modules 21 that rotated around the guide hinge 23 may perform an extension motion to have an initial angle before rotation and accordingly, the soft robot 2 may have the form of the first mode in which the soft robot 2 is arranged in a plane.

On the contrary, as shown in FIGS. 10 and 11, when the pressure applied to the internal spaces 2111 and 2121 of each of the connected drive modules 21 adjacent to each other is greater than the second threshold pressure PS, each of the elastic bladders 221 of the first snap shell 22a and the second snap shell 22b may expand outward and make a snap movement to interfere with each other and generate force to push each other. The adjacent drive modules 21 may then rotate around the guide hinge 23 at or above a set angle and accordingly the soft robot 2 may have the form of the second mode in which the soft robot 2 includes a ring structure around an axis parallel to the forward direction.

The controller 26 may individually apply pneumatic pressure from the pneumatic pressure source 25 to each of the plurality of drive modules 21.

For example, as shown in FIG. 6, pneumatic pressure may be individually applied to each of the plurality of drive modules 21 in one configuration. In another example, however, the plurality of drive modules 21 may be connected to communicate with each other through a separate tubular member.

For example, the elastic tendon 22c may be a tubular member that connects the first snap shell 22a to the second snap shell 22b to allow communication between the first snap shell 22a and the second snap shell 22b. In this case, pneumatic pressure may be applied to all of the plurality of drive modules 21 by applying pneumatic pressure only to at least one driving module 21, without a need for all of the plurality of drive modules 21 to be individually connected to the pneumatic pressure source 25.

For example, referring to FIG. 4 again, when the soft robot 2 is in the first mode state, and when the magnitude of the pressure is not greater than the second threshold pressure $P_S$ even when the pressure applied to the internal spaces of the drive modules 21 is increased, the snap joint portion 22 may not make a snap movement and may maintain the first mode state in which the elastic bladder 221 is contracted inward. However, when and only when the magnitude of the pressure is greater than the second threshold pressure $P_S$, the snap joint portion 22 may expand outward and make a snap movement, thereby converting into the second mode as shown in FIGS. 10 and 11.

For example, when the soft robot 2 performs a walking motion in the forward direction in the first mode (see FIGS. 6 to 9), the controller 26 may extend or contract the length of the corrugated pipe 213 of the drive modules 21 by repeatedly increasing or decreasing the magnitude of the pneumatic pressure applied to the drive modules 21. The pressure formed in the drive modules 21 may be adjusted within a range that does not exceed the second threshold pressure $P_S$.

Likewise, referring to FIG. 4 again, when the snap joint portion 22 makes a snap movement and is in the second mode state, and when the magnitude of the pressure is not less than the first threshold pressure $P_{SB}$ even when a negative pressure is formed in the internal spaces of the drive modules 21, the snap joint portion 22 may not make a snap-back movement and may maintain the second mode state in which the elastic bladder 221 is expanded outward. However, when and only when the pressure in the internal spaces of the drive modules 21 is less than the first threshold pressure $P_{SB}$, the snap joint portion 22 may contract inward and make a snap-back movement, thereby converting into the first mode as shown in FIG. 5.

For example, when the soft robot 2 performs a motion in the forward direction in the second mode (see FIGS. 10 and 11), the controller 26 may extend or contract the length of the corrugated pipe 213 of the drive modules 21 by repeatedly increasing or decreasing the magnitude of the pneumatic pressure applied to the drive modules 21. The pressure formed in the drive modules 21 may be adjusted within a range that does not become less than the first threshold pressure $P_{SB}$.

For example, when the soft robot 2 makes a motion in the forward direction in the first mode and the second mode, the magnitude of pressure that the controller 26 forms in the drive modules 21 may be adjusted within a range between the first threshold pressure $P_{SB}$ and the second threshold pressure $P_S$.

Figure 12:
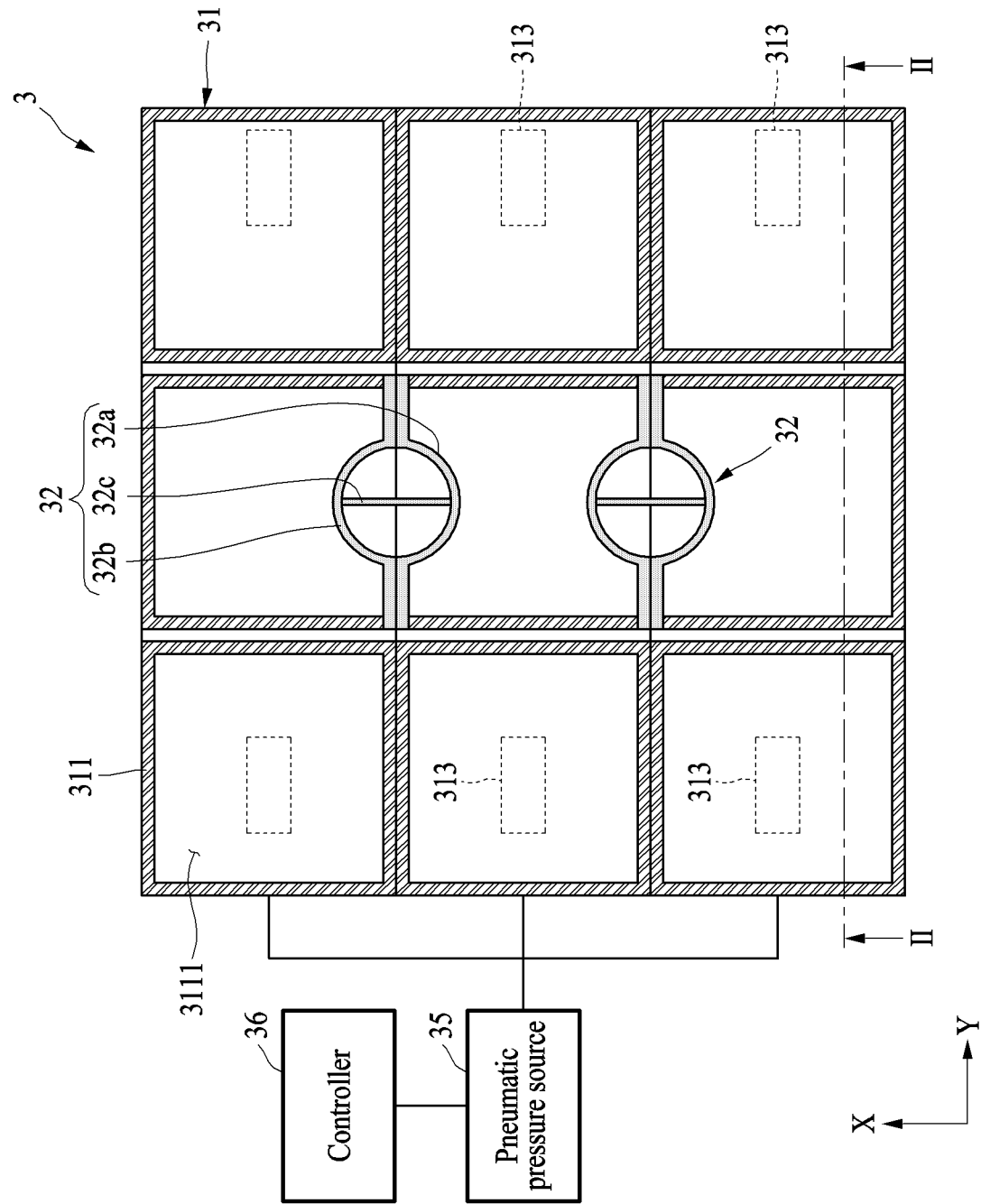
FIG. 12 is a horizontal cross-section of a soft robot according to an embodiment.
Figure 13:
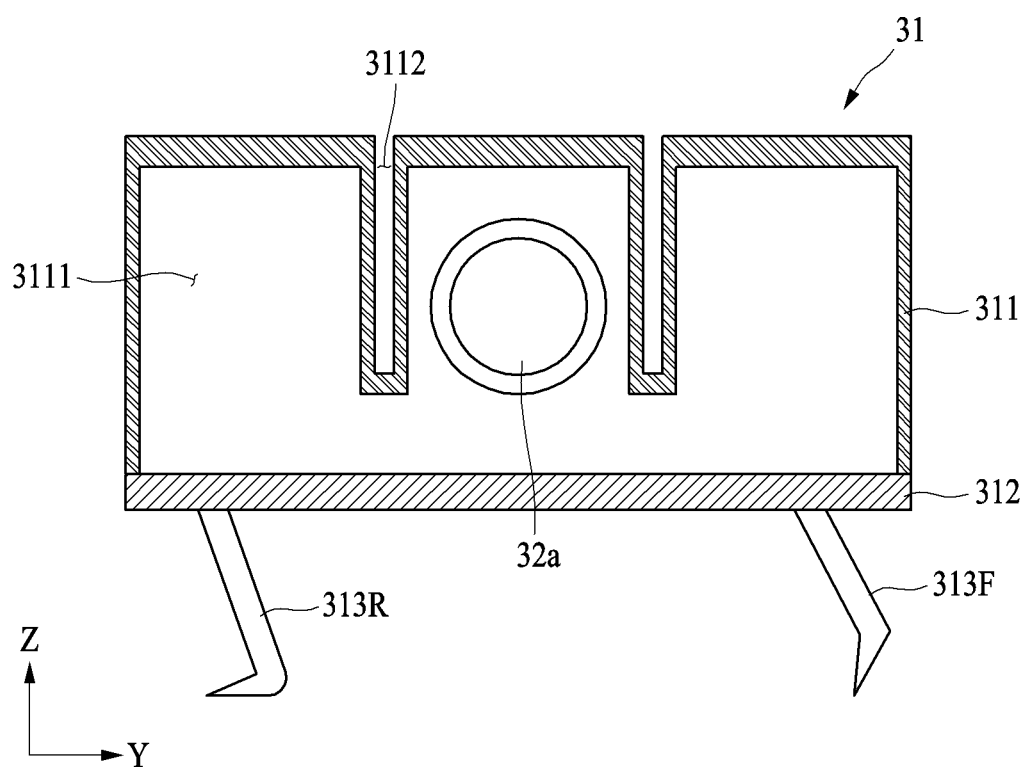
FIG. 13 is a vertical cross-section of the soft robot according to an embodiment.
Figure 14:
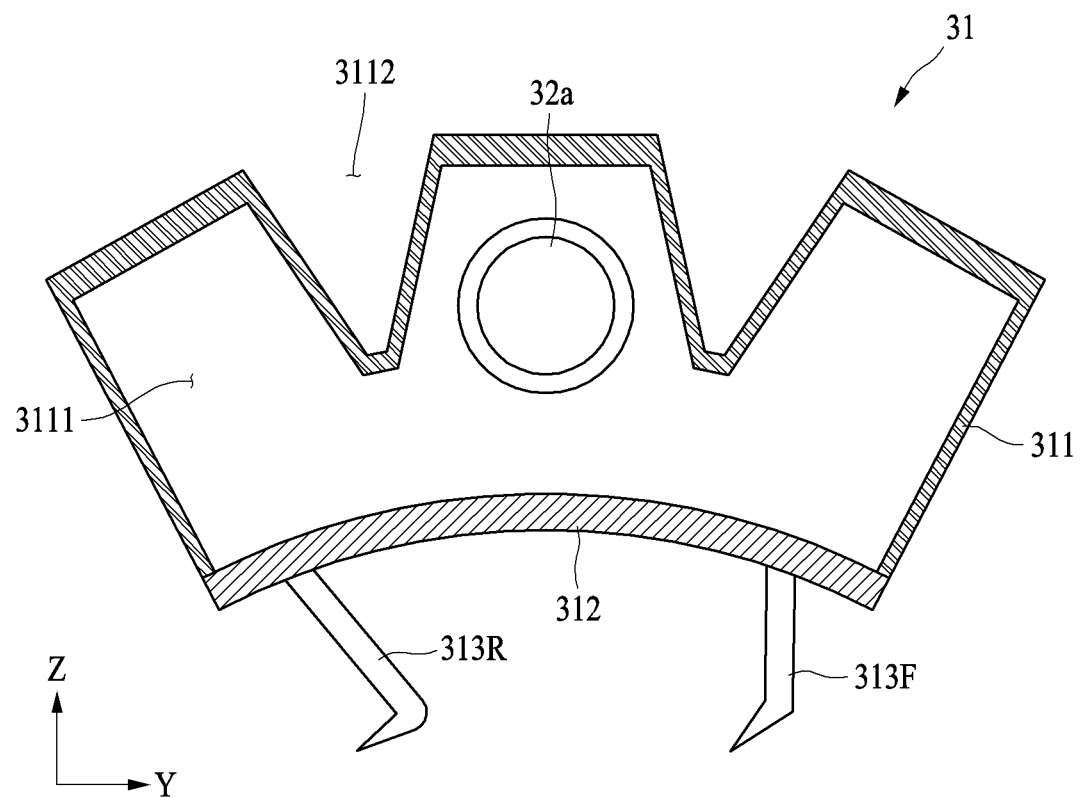
FIG. 14 is a vertical cross-section of the soft robot according to an embodiment.

FIG. 12 is a horizontal cross-section of a soft robot according to an embodiment, FIG. 13 is a vertical cross-section of a soft robot according to an embodiment, and FIG. 14 is a vertical cross-section of a soft robot according to an embodiment.

Referring to FIGS. 12 to 14, a configuration of an embodiment of a soft robot 3 including a configuration of a drive module 31 that is different from the configuration of the soft robot 2 of the embodiments shown in FIGS. 5 to 11 may be known.

In addition, FIGS. 13 and 14 illustrate a configuration of operation shown as a vertical cross-section of the drive module 31 taken along the line II-II of FIG. 12, according to an embodiment.

The soft robot 3 according to an embodiment may be a soft robot based on a soft actuator that may selectively and reversibly convert between two modes by employing the configuration of the snap-through joint module 1 of the embodiments shown in FIGS. 1 to 4.

For example, the soft robot 3 may be understood as a soft robot in which only the configuration of the drive module 21 of the soft robot 2 of the embodiments shown in FIGS. 5 to 11 is replaced.

For example, the soft robot 3 may include a plurality of drive modules 31 that performs a bending motion through pneumatic pressure and that is spaced apart from each other in a direction perpendicular to the forward direction, a plurality of snap joint portions 32 configured to connect a pair of adjacent drive modules 31 among the plurality of drive modules 31, a guide hinge configured to support and connect end portions of a pair of adjacent drive modules 31 among the plurality of drive modules 31 so that each of the pair of adjacent drive modules may rotate relative to each other, a pneumatic pressure source 35 that supplies pneumatic pressure, and a controller 36 configured to control pneumatic pressure applied to internal spaces of the plurality of drive modules 31 through the pneumatic source 35.

For example, each of the plurality of drive modules 31 may be a pneu-net member that performs a bending motion or extension motion through control of pneumatic pressure.

For example, by designing the drive module 31 to differentially expand along the upper and lower directions (a Z-axis direction in the drawing) of the internal space 3111 to which pneumatic pressure is applied, the degree of resulting deformation may also be differentially formed when pneumatic pressure is applied to the internal space 3111, and accordingly, the drive module 31 may include a soft actuator structure that performs a bending or twisting movement.

For example, the drive module 31 may include an upper housing 311 having an internal space 3111 extending along the forward direction, a lower base 312 disposed below the upper housing 311 and configured to form a floor of the internal space 3111, and a leg portion 313 having a ratchet shape disposed at each of points of the lower base 312 that are spaced apart from each other along the forward direction.

For example, the drive module 31 may have a groove 3112 in which the structure of the upper housing 311 is recessed in the form of an incision inward along the horizontal direction (the X-axis direction in the drawing) perpendicular to the forward direction. The thickness of the bent wall of the upper housing 311 forming the groove 3112 may be less than the thickness of the remaining wall.

In another example, in order to differentially deform the upper housing 311, the drive module 31 may include another soft actuator structure, in which a wall of an upper portion is relatively thinner or an upper portion is formed of a relatively more flexible material, that may generate differential deformation.

For example, the lower base 312 may be made of a stronger material than a material of the upper housing 311 or may be made of a member with a thickness greater than the thickness of a wall of the upper housing 311.

The snap joint portion 32 may include a first snap shell 32a disposed on the upper housing 311 of one drive module 31 of a connected pair of adjacent drive modules 31, a second snap shell 32b disposed on the upper housing 311 of the other drive module 31, and an elastic tendon 32c configured to connect the first snap shell 32a to the second snap shell 32b.

The leg portion 313 may be disposed on a lower side of the lower base 312 and provide a movement direction to the soft robot 3.

For example, the leg portion 313 may include a rear leg 313R disposed at the rear of the lower base 312 and a front leg 313F disposed at the front of the lower base 312, based on the forward direction.

For example, the front leg 313F and the rear leg 313R may have a ratchet-shaped protruding structure in which the lower end portion is bent obliquely toward the rear, as shown in FIGS. 13 and 14. The end portion of the rear leg 313R may protrude at an angle that converges relatively toward the rear than the end portion of the front leg 313F.

According to the above structure, as shown in FIG. 13, when the controller is to perform a bending motion by applying pneumatic pressure to the driving module 31, the frictional resistance between the front leg 313F and the ground may be formed to be greater than the frictional resistance between the rear leg 313R and the ground based on the angle of the end portion of the leg portion 313 that is in contact with the ground. Consequently, the front leg 313F may serve as a stepping axis that allows the rear leg 313R to move in the forward direction.

Subsequently, as shown in FIG. 14, at the point when the drive module 31 is expanded and performs a bending motion, when the controller 36 is to perform a restoring motion in a bent state by reducing the magnitude of pneumatic pressure that the controller 36 applies to the drive module 31, the frictional resistance between the rear leg 313R and the ground may be formed to be greater than the frictional resistance between the front leg 313F and the ground based on the angle of the end portion of the leg portion 313 that is in contact with the ground. Consequently, the rear leg 313R may serve as a stepping axis that allows the front leg 313F to move in the forward direction.

As described above, the embodiment has been described with reference to specific matters such as specific components and limited embodiments and drawings, but these are provided to help the overall understanding. Also, the present disclosure is not limited to the above-described embodiments, and various modifications and variations are possible from these descriptions by one of ordinary skill in the art to which the present disclosure pertains. Accordingly, the scope of the present disclosure is defined not by the detailed description, but by the claims and their equivalents, and all variations within the scope of the claims and their equivalents are to be construed as being included in the disclosure.

What is claimed is:

1. A snap-through joint module comprising:
   a first member having a first internal space to which pneumatic pressure is applied;
   a second member having a second internal space to which pneumatic pressure is applied;
   a snap joint portion configured to connect the first member to the second member and capable of a snap-through movement by pneumatic pressure applied to the first member and the second member; and
   a controller configured to control pneumatic pressure applied to the first internal space and the second internal space,
   wherein the snap joint portion comprises:
   a first snap shell having a shell structure disposed at an end portion of the first member facing the first internal space;

a second snap shell having a shell structure disposed at an end portion of the second member facing the second internal space; and an elastic tendon configured to connect the first snap shell to the second snap shell, wherein each of the first snap shell and the second snap shell comprises:

an elastic cover disposed to face the first internal space and the second internal space, respectively, to which pneumatic pressure is applied; and an elastic bladder in a shape of a pocket that is formed integrally with the elastic cover and capable of expansion and contraction, wherein the elastic tendon has a tubular structure configured to connect the first snap shell to the second snap shell to allow communication between the elastic bladder of the first snap shell and the elastic bladder of the second snap shell.

2. The snap-through joint module of claim 1, further comprising:

a flexible, thin film-shaped guide hinge configured to support and connect the end portion of the first member and the end portion of the second member connected by the snap joint portion to allow the first member and the second member to rotate relative to each other.

3. The snap-through joint module of claim 2, wherein each of the first snap shell and the second snap shell is configured to:

make a snap-back movement so that the elastic bladder contracts inward when pressure formed in the first internal space and the second internal space that the first snap shell and the second snap shell respectively face is less than or equal to a first threshold pressure; and make a snap movement as the elastic bladder expands outward when pressure formed in the first internal space and the second internal space that the first snap shell and the second snap shell respectively face is greater than or equal to a second threshold pressure.

4. The snap-through joint module of claim 3, wherein, when each of the first snap shell and the second snap shell expands and makes the snap movement, each of the first snap shell and the second snap shell is configured to expand to interfere with each other and the first member and the second member are configured to perform a rotational motion around the guide hinge at a set angle or more, and when each of the first snap shell and the second snap shell contracts and makes the snap-back movement, due to tension formed as the elastic tendon connecting each elastic bladder is stretched, the first member and the second member are configured to perform an extension motion to have an initial angle before rotation around the guide hinge.

5. The snap-through joint module of claim 1, wherein the elastic bladder has a spherical or arch shape in a portion protruding from the elastic cover.

6. A soft robot comprising:

a plurality of drive modules capable of expanding or contracting based on a forward direction through pneumatic pressure and spaced apart from and connected to each other in a direction perpendicular to the forward direction;

a plurality of snap joint portions configured to connect a pair of adjacent drive modules among the plurality of drive modules and capable of a snap-through movement by pneumatic pressure applied to the plurality of drive modules; and a controller configured to control pneumatic pressure applied to the plurality of drive modules, wherein each of the plurality of snap joint portions comprises:

a first snap shell having a shell structure disposed at an end portion of one drive module of the connected pair of adjacent drive modules facing an internal space of the one drive module;

a second snap shell having a shell structure disposed at an end portion of the other drive module of the connected pair of adjacent drive modules facing an internal space of the other drive module; and an elastic tendon configured to connect the first snap shell to the second snap shell.

7. The soft robot of claim 6, wherein each of the first snap shell and the second snap shell is configured to:

make a snap-back movement to contract inward when pressure formed in the internal space of the drive module in which each of the first snap shell and the second snap shell is disposed is less than or equal to a first threshold pressure; and expand outward and make a snap movement when pressure formed in the internal space of the drive module in which each of the first snap shell and the second snap shell is disposed is greater than or equal to a second threshold pressure.

8. The soft robot of claim 7, wherein the drive module comprises:

a rear block disposed in a rear based on the forward direction and having the internal space to which pneumatic pressure is applied;

a front block disposed in a front based on the forward direction and having the internal space to which pneumatic pressure is applied;

a corrugated pipe configured to connect the internal spaces of each of the rear block and the front block along the forward direction to allow communication between the internal spaces and capable of expanding or contracting along the forward direction; and a leg portion disposed on each of the rear block and the front block and having an inclined protrusion protruding backward based on the forward direction at an inclined angle.

9. The soft robot of claim 8, wherein the controller is configured to:

expand or contract the corrugated pipe of the drive module by repeatedly increasing or decreasing a size of pneumatic pressure applied to the internal space of the drive module in a range between the first threshold pressure and the second threshold pressure.

10. The soft robot of claim 7, wherein the elastic tendon has a tubular structure configured to connect the first snap shell to the second snap shell to allow communication between the first snap shell and the second snap shell.

11. The soft robot of claim 7, further comprising:

a plurality of guide hinges disposed between each of the end portions of the pair of drive modules connected by the plurality of snap joint portions and configured to support and connect the pair of drive modules to allow each of the pair of drive modules to rotate around a rotation axis parallel to the forward direction, wherein, when the controller allows each of the first snap shell and the second snap shell of each of the plurality of snap joint portions to make a snap movement to push each other by expanding each of the first snap shell and the second snap shell, the plurality of drive modules connected by the plurality of snap joint portions is configured to rotate around the plurality of guide hinges at a set angle or more so that the plurality of drive modules are arranged in a ring shape that is radially spaced apart from each other.

12. The soft robot of claim 11, wherein each of the plurality of drive modules comprises a guide magnet disposed at the end portions to which the guide hinge is connected,
wherein, when the plurality of drive modules rotates radially to have a ring shape, the guide magnet of each of the pair of adjacent drive modules is configured to magnetically contact each other and maintain a posture between the pair of adjacent drive modules.

13. A soft robot comprising:
a plurality of drive modules that perform a bending motion through pneumatic pressure and that are spaced apart from and connected to each other in a direction perpendicular to a forward direction;
a plurality of snap joint portions configured to connect a pair of adjacent drive modules among the plurality of drive modules and capable of a snap-through movement by pneumatic pressure applied to the plurality of drive modules; and
a controller configured to control pneumatic pressure applied to the plurality of drive modules,
wherein each of the plurality of snap joint portions comprises:
a first snap shell having a shell structure disposed at an end portion of one drive module of the connected pair of adjacent drive modules facing an internal space of the one drive module;
a second snap shell having a shell structure disposed at an end portion of the other drive module of the connected pair of adjacent drive modules facing an internal space of the other drive module; and
an elastic tendon configured to connect the first snap shell to the second snap shell,
wherein each of the first snap shell and the second snap shell is configured to:
make a snap-back movement to contract inward when pressure formed in the internal space of the drive module in which each of the first snap shell and the second snap shell is disposed is less than or equal to a first threshold pressure; and
expand outward and make a snap movement when pressure formed in the internal space of the drive module in which each of the first snap shell and the second snap shell is disposed is greater than or equal to a second threshold pressure,
wherein each of the plurality of drive modules comprise:
an upper housing having the internal space extending along the forward direction;
a lower base disposed below the upper housing and configured to form a floor of the internal space; and
a plurality of leg portions formed on and protruding from respective positions on the lower base that are spaced apart from each other along the forward direction.

14. The soft robot of claim 13, wherein the drive module is a pneumatic network (pneu-net) member in which a degree of deformation due to pneumatic pressure is greater in an upper portion of the drive module.

15. The soft robot of claim 13, wherein the lower base is made of a stronger material than a material of the upper housing.

* * * * *